United States Patent [19]
Pickett

[11] 3,972,350
[45] Aug. 3, 1976

[54] ROTARY VALVE

[76] Inventor: John E. P. Pickett, 3323 Pinafore Drive, Durham, N.C. 27705

[22] Filed: Sept. 24, 1975

[21] Appl. No.: 616,145

[52] U.S. Cl. .................... 137/624.18; 137/625.11
[51] Int. Cl.² ................................... F16K 11/06
[58] Field of Search ............... 137/624.11, 624.13, 137/624.15, 624.18, 624.2, 625.11; 118/7

[56] References Cited
UNITED STATES PATENTS 3,246,667   4/1966   Pemberton ............... 137/625.11 X
3,307,579   3/1967   Beddoes .................. 137/624.18
3,892,197   7/1975   Kinney .......................... 118/7

Primary Examiner—Alan Cohan
Attorney, Agent, or Firm—B. B. Olive

[57] ABSTRACT

An automatic programmed histologic tissue processor is provided with a rotary valve useful for sequentially transporting the various treating fluids from their respective stock fluid containers to the processing chamber and for returning each fluid to its respective container after it has been used in the programmed processing procedure.

10 Claims, 5 Drawing Figures

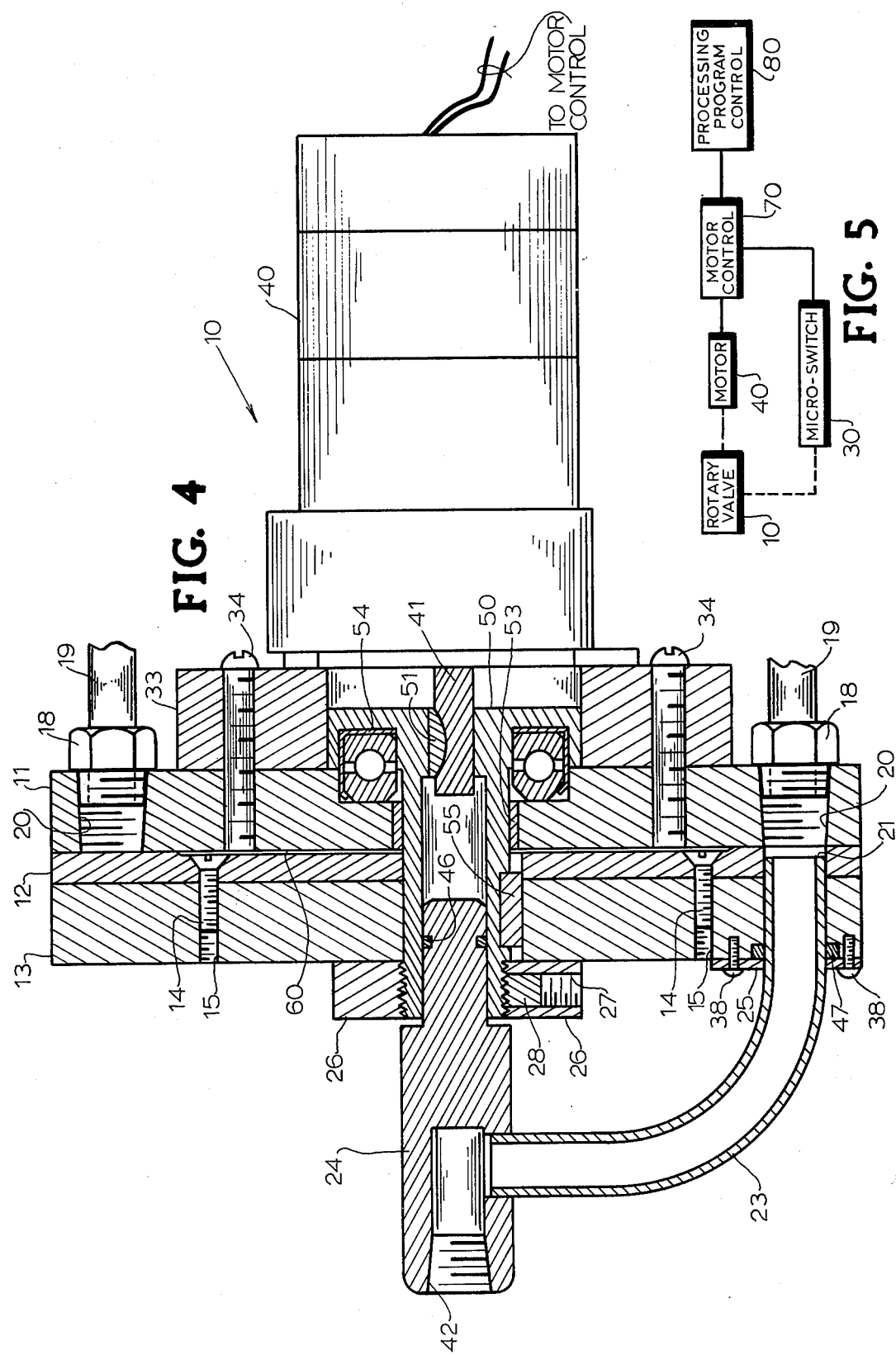

3,972,350

ROTARY VALVE

BACKGROUND OF THE INVENTION

1. Field of the Invention:

The invention relates to fluid distributors. More specifically, the invention relates to a rotary valve which sequentially connects a plurality of fluid inlet lines to a single fluid outlet line.

2. Description of the Prior Art:

During the handling of fluids in many types of work, it is necessary to periodically distribute a plurality of different fluids to a common point; and, in some instances, it is desirable to return each fluid separately to its respective container. In the processing and staining of histologic tissue sections, it is desirable to sequentially transfer each of the various treating fluids from its respective fluid container to a processing chamber and to return each such fluid to its container before introduction of the next treating fluid. In this regard, U.S. Pat. No. 3,892,197 discloses a rotary valve made of a rotatable plate and a fixed plate for use in a light microscopy tissue processor. U.S. Pat. Nos. 2,959,151 and 3,400,726 also describe apparatus for treating biological preparations having rotary distributor elements useful in the distrubution of the treating fluids. It is the purpose of the present invention to provide a reliable leakproof construction and a simple start/stop switch mechanism for a rotary valve of the general type disclosed in U.S. Pat. No. 3,892,197.

Fluid distributors having rotary distributor discs have been in use for years in the fuel injection systems of internal combustion engines as illustrated in U.S. Pat. No. 3,079,948. Such fluid distributors are designed to provide incremental distribution of fluid from a single source to individual outlets. U.S. Pat. No. 3,124,162 discloses a fluid valve of more general application designed to supply fluid to a plurality of fluid outlets from a single main. Other patents broadly teaching fluid distributors incorporating rotary distribution elements include U.S. Pat. Nos. 3,076,478 and 3,319,655.

It is believed that the prior art fails to teach a simple, reliable and substantially leakproof rotary valve adapted for use in automatic programmed fluid transfer devices.

SUMMARY OF THE INVENTION

The rotary valve of the present invention serves as a multiple-disc fluid distributor useful in successively connecting a plurality of fluid inlet lines to a single fluid outlet line. The valve comprises a stationary disc having a selected number of annularly disposed apertures which are connected to the inlet lines. A bearing disc and a revolving disc having a single outlet port therethrough bear against the stationary disc and revolve so that the outlet port sequentially registers over each of the apertures. The revolving disc has a plurality of equally-spaced detents on its peripheral surface. A micro-switch arrangement successively engages these detents and serves to stop the revolving disc and bearing disc so that the outlet port will precisely register over each aperture.

In the preferred embodiment, the invention is adapted to connect the treating fluid inlet lines of a programmed histologic tissue processor with the sealed processing chamber. At predetermined intervals, each treating fluid is sequentially drawn into the processing chamber through the rotary valve and returned to its container by pressure applied to the processing chamber. The valve serves to register the outlet port with each inlet port. This procedure continues until each treating fluid in the programmed sequence is introduced into the processing chamber.

DESCRIPTION OF THE DRAWINGS

FIG. 4 is a section view of the rotary valve taken substantially along line 4—4 of FIG. 2 and with the motor and inlet lines not sectioned for purposes of illustration.

FIG. 5 is a block diagram of the system for controlling the energization of the rotary valve.

DESCRIPTION OF THE PREFERRED EMBODIMENT

Figure 1:
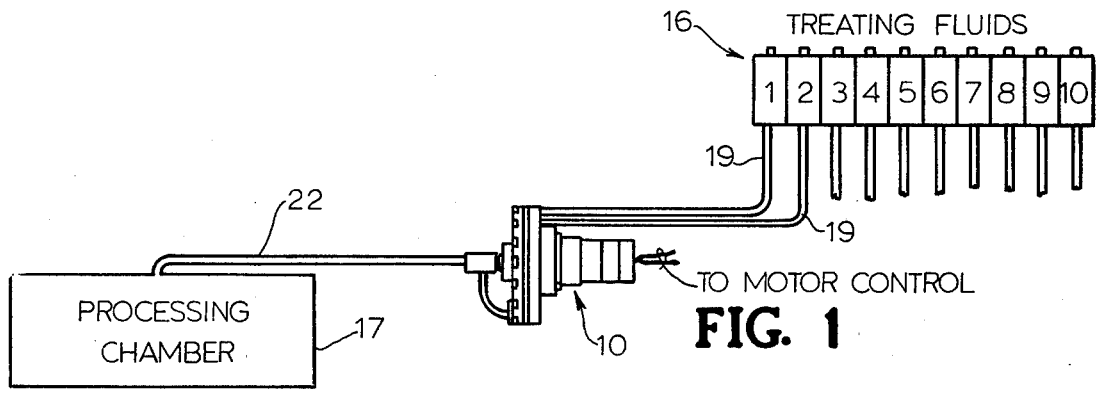
FIG. 1 is a schematic diagram of the rotary valve of the present invention and associated portions of a histologic tissue processor showing the paths followed by the treating fluids in travel to and from the processing chamber.

Referring to FIG. 1, the rotary valve 10 of the present invention is shown in operative assembly in association with a portion of an automatic programmed histologic tissue processor of the type disclosed in U.S. Pat. No. 3,892,197. The patented processor provides ten containers 16 filled with the various tissue treating fluids and ten inlet lines 19 for connecting each of containers 16 to the rotary valve 10 by means of inlet line connectors 18. The processing operation requires each treating fluid to be conveyed individually to a sealed processing chamber 17 and then returned through one of inlet lines 19 to its respective container. Each fluid is drawn by vacuum through its respective inlet line 19 to chamber 17 and returned to its container by pressure which is applied to chamber 17. The pressurization of chamber 17 is automatically controlled in the programmed processing procedure in the manner taught by U.S. Pat. No. 3,892,197. Thus, valve 10 serves to connect the appropriate inlet line 19 to an outlet line 22 during the introduction and removal of each selected treating fluid from chamber 17.

The construction of rotary valve 10 will now be described in detail. Valve 10 comprises a stationary disc 11, a bearing disc 12, and a revolving disc 13. Disc 11 has fourteen annularly-disposed, circumferentially equally-spaced apertures 20. Ten of the fourteen apertures 20 are attached to the inlet lines 19. The remaining four apertures 20 are blanks which aid in the programmed sequence in a manner described later.

Discs 12 and 13 are fixedly secured together by eight disc mounting screws 14 which fit within countersunk holes 15 (FIG. 4). Disc 12 is adapted to bear against the front surface of disc 11 with sufficient pressure to prevent leakage of fluids between discs 11 and 12. A shaft nut 26 allows for manual adjustment of the pressure between discs 11 and 12.

Figure 3:
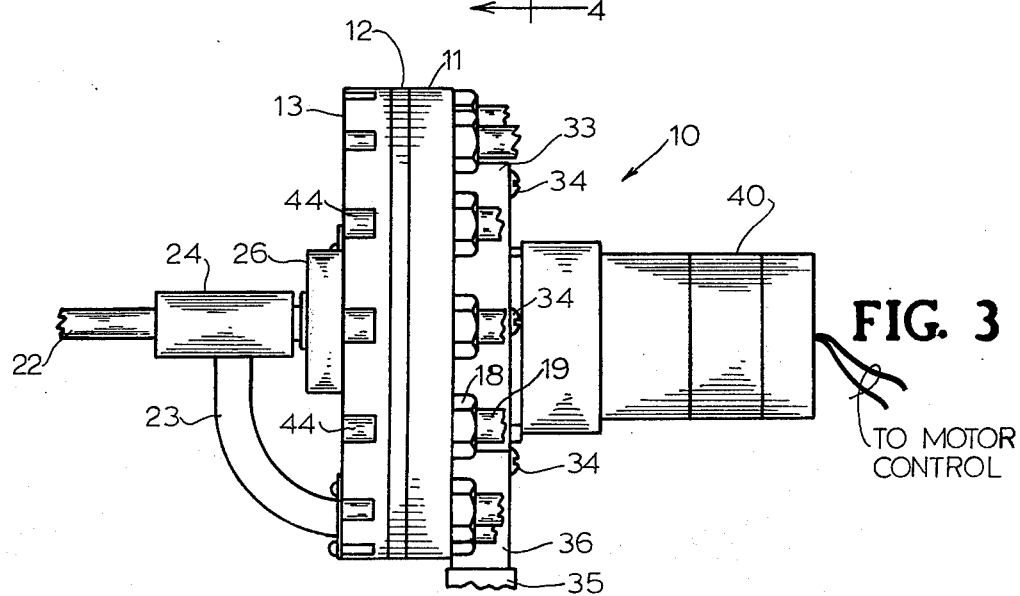
FIG. 3 is a side view of the rotary valve shown in FIG. 2.

Referring to FIG. 4, a single exit port 21 extends through disc 13 and continues through disc 12. Port 21 is positioned at a radial distance from the center of valve 10 so as to align with and sequentially register with each of apertures 20. Port 21 receives a curved fluid transfer tube 23 which in turn leads into a transfer shaft 24 and outlet line 22 (FIG. 3). Transfer tube 23 is held in place within port 21 by a transfer tube mounting plate 25 which is secured to tube 23 and to disc 13 by screws 38. An O-ring 47 helps to prevent leakage from port 21. Transfer tube 23 and transfer shaft 24 revolve with discs 12 and 13. Outlet line 22 resides within an opening 42 in shaft 24 and is adapted to remain stationary so that it does not revolve with shaft 24.

Figure 2:
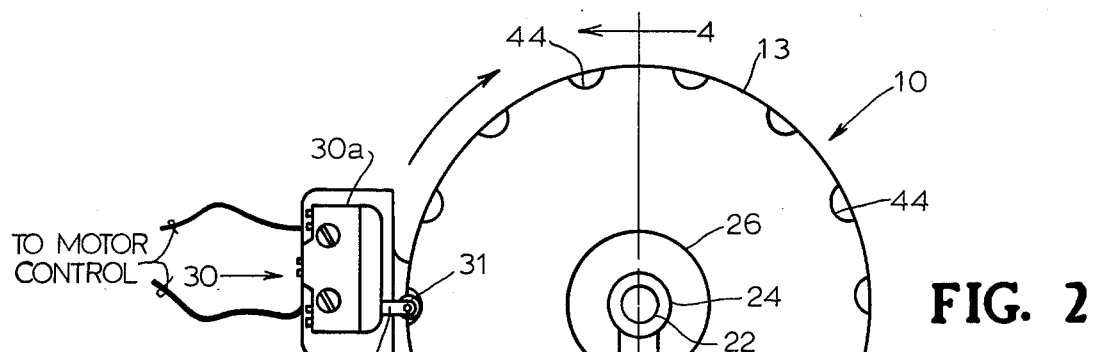
FIG. 2 is a front view of the rotary valve showing the micro-switch detent arrangement used for indexing the valve.

As best shown in FIGS. 2 and 3, valve 10 is secured to the frame of the tissue processor by a pair of valve mounting legs 36 and a valve mounting base 35. Legs 36 are fixedly secured to a motor mount 33, and mount 33 is in turn secured to stationary disc 11 by screws 34. Discs 12 and 13 are rotatably driven by a gear motor 40 which as a drive shaft 41. A shaft extension 50 is connected to shaft 41 by means of a shaft key 51. Shaft extension 50 is free to rotate within motor mount 33 and stationary disc 11. A ball type thrust bearing 54 and a shaft bearing 53 provide low-friction bearing surfaces around shaft extension 50. A key member 55 serves to connect shaft extension 50 to discs 12 and 13 for transferring the rotation of shaft 41 to discs 12 and 13. The interior wall surfaces of shaft extension 50 also engage revolving fluid transfer shaft 24. An O-ring 46 resides between shaft extension 50 and shaft 24. In the specific embodiment, motor 40 is a gear motor manufactured by Von Weise Gear Company, St. Louis, Missouri, Model No. VW1A-20-1.320 (20 rpm) and thrust bearing 54 is a stainless steel, unground, banded full-ball type thrust bearing.

As best shown in FIG. 4, the bearing pressure between discs 11 and 12 is controlled by a shaft nut 26 which is screwed onto the threaded end portion of shaft extension 50. By tightening shaft nut 26 against disc 13, the pressure between discs 11 and 12 is increased to the pressure necessary to prevent leakage. Once the desired pressure is reached, a thread locking insert 28 is forced against the threads of shaft extension 50 by means of an Allen type shaft nut set screw 27. In the illustrated embodiment, bearing disc 12 is provided with an inner circular recess 60 so that this inner portion of disc 12 will not contact disc 11. Thus, recess 60 enables the entire force exerted by shaft nut 26 to be transferred along the outer surfaces of discs 11 and 12 adjacent apertures 20.

The programmed operation of valve 10 requires each treating fluid to be separately delivered to chamber 17 where the fluid remains for a predetermined time. The fluid is then returned to its respective container 16. In order to deliver the next treating fluid in the sequence to chamber 17, discs 12 and 13 must turn one-fourteenth of a revolution to register port 21 over the next aperture 20. This operation of valve 10 is controlled by a processing program control 80 (FIG. 5) such as the control described in U.S. Pat. No. 3,892,197. At predetermined intervals immediately preceeding the delivery of each fluid, control 80 instructs a motor control 70 to energize motor 40. Motor 40 then runs for one-fourteenth of a revolution until it is stopped by a micro-switch 30 in the manner described below.

Micro-switch 30 comprises a switch body 30a, a spring-loaded arm member 32 and a roller member 31 positioned at the end of arm 32 (FIG. 2). Micro-switch 30 is normally open when arm 32 is extended away from body 30a. When roller 31 is urged toward body 30a, thereby causing arm 32 to pivot toward body 30a, micro-switch 30 is closed. Roller 31 is adapted to roll along the peripheral surface of revolving disc 13. Disc 13 has on its peripheral surface fourteen equally-spaced detents 44, each of which is adapted to engage roller 31 and thereby open the power circuit to motor 40 when roller 31 rests in one of detents 44. The position of detents 44 is coordinated with the position of port 21 so as to sequentially register port 21 over each consecutive one of apertures 20 during the programmed operation of the tissue processor. It is important for gear motor 40 to be provided with a positive braking system to immediately stop the rotation of shaft 41 when micro-switch 30 cuts off power to motor 40. Such a braking system has the advantage of stopping the rotation of discs 12 and 13 with port 21 registered precisely over one of apertures 20.

In operation, each of treating fluid containers 16 is filled with one of the fixation, processing or cleaning solutions required in the tissue processing operation. In order to begin the processing operation, chamber 17 is filled with tissue specimens which have been placed within the perforated tissue receptacles well known in the art. Chamber 17 is then sealed and the programmed operation is begun at which time the inlet line 19 leading to treating fluid number one is aligned with port 21. Next, a vacuum is created in chamber 17 to draw treating fluid number one into the chamber 17. After a predetermined time, chamber 17 is pressurized in order to force treating fluid number one back through valve 10 and into its respective container 16. Motor 40 is then energized by motor control 70 so that discs 12 and 13 begin to revolve. After one-fourteenth of a revolution, roller 31 engages the next succeeding detent 44 in order to cut off power to motor 40. At this time, port 21 registers with the inlet line 19 corresponding to treating fluid number two. The above procedure continues until each of treating fluids 1 through 10 has been individually drawn into chamber 17 and returned to its respective container 16. After fluid number ten has been returned to its container, disc 13 revolves so that port 21 aligns with one of the four blank apertures 20 to prevent any undesirable drainage of treating fluids through valve 10. Valve 10 is not operable during paraffin embedding of the tissue in chamber 17 and remains inoperative until the first treating fluid is introduced into chamber 17 in the next programmed processing operation.

In the specific embodiment, discs 11, 12 and 13 have a diameter of 6½ inches. The center of apertures 20 and port 21 are located 2¾ inches from the center of the disc. Discs 11 and 13 are made from stainless steel and have thicknesses of ⅝ inch. Bearing disc 12 is made from Teflon and has a thickness of ¼ inch. Detents 44 are approximately ⅛ inch deep and are spaced at approximately 26° intervals on the peripheral surface of disc 13.

Although rotary valve 10 has been illustrated in the preferred embodiment as forming part of an automatic light microscopy processor, it should be realized that valve 10 can be incorporated into a tissue staining apparatus or into an automatic electron microscopy tissue processor or into numerous other fluid transfer devices. Bearing disc 12 has been illustrated as connected to revolving disc 13. However, as an alternative, bearing disc 12 could be secured to the stationary disc 11 and provided with holes mating with apertures 20. In this alternative embodiment, the pressure for preventing leaks would be between discs 12 and 13. It should be apparent from the foregoing description that disc 11 need not be a circular disc, but it could instead be a flat plate of any shape and size sufficient to envelop apertures 20. The specific embodiment herein illustrated is provided with three discs; however, appropriate complimentary bearing surfaces could be provided on both the stationary disc and the revolving disc so that the valve could be made with only two discs.

In summary, the present invention provides a unique and extremely useful fluid distributor for use in tissue treating devices or other systems requiring the sequential connection of a plurality of fluid inlet lines to a single fluid outlet line and being adapted to distribute a plurality of different fluids to a common point and, when required, return each fluid separately to its respective source. The novel micro-switch detent arrangement enables the revolving disc 13 to be accurately and reliably indexed so as to register port 21 with each of apertures 20. Of course, the single "inlet" can be sequentially connected to the plural "outlets" for transfer of a common fluid for cleaning operations and the like.

What is claimed is:

1. In a fluid distribution system, a rotary valve useful for sequentially connecting a plurality of fluid inlet lines to a single fluid outlet line, said outlet line and each of said inlet lines having valve ends and remote ends, and said inlet lines being connected at their remote ends to a plurality of fluid sources, said system comprising in combination:
   a. a frame;
   b. an electric motor mounted on said frame and having a drive shaft extending therefrom;
   c. a stationary plate having a front bearing surface and a rear surface and having a selected number of annularly disposed apertures circumferentially spaced at selected intervals with the number of such apertures being at least as great as the number of said inlet lines and with each of said inlet lines at its valve end being connected at the rear surface of said plate to one of said apertures;
   d. a substantially flat circular member having a front surface and a rear bearing surface and being secured at its center to said motor shaft for being rotatably driven thereby, said circular member being aligned on said shaft with the rear bearing surface of said circular member in contact with the front bearing surface of said stationary plate and with the center of said circular member axially aligned along said shaft with the center of the circle defined by said annularly disposed apertures, said circular member having a single opening connected to said fluid outlet line and positioned at a predetermined radial distance from the center of said member so as to be adapted to register over each of said annularly disposed apertures upon rotation of said member, said circular member having on its peripheral edge surface a plurality of surface irregularities spaced at selected intervals and adapted to being engaged by a sensor member riding on said peripheral edge surface;
   e. switch means electrically connected to said motor and having a sensor member positioned to ride on said peripheral edge surface, said sensor member being adapted to sense the presence of said irregularities and to open said switch means and switch off the power to said motor each time said sensor member senses one of said irregularities, said irregularities and annularly spaced apertures being selectively spaced so as to allow said opening to register over a selected one of said apertures at least a portion of the times when said motor is stopped by said switch means;
   f. means for holding the rear bearing surface of said circular member and the front bearing surface of said stationary plate in firm surface-to-surface contact so as to prevent leakage between said opening and said apertures.

2. A fluid distribution system as claimed in claim 1 wherein said surface irregularities comprise detents and said switch sensor member comprises a spring-loaded roller member adapted to roll on said peripheral surface and engage said detents for opening said switch means.

3. A fluid distribution system as claimed in claim 2 wherein the number of said detents equals the number of said annularly disposed apertures and both said detents and said apertures are circumferentially equally spaced.

4. A fluid distribution system as claimed in claim 1 wherein wherein the number of said irregularities equals the number of said annularly disposed apertures.

5. A fluid distribution system as claimed in claim 1 wherein said stationary plate is a disc having the same circumference as said circular member and with said disc being concentric with the circle defined by said annularly disposed apertures.

6. A fluid distribution system as claimed in claim 5 wherein said circular member comprises two disc members, a first such disc member possessing said irregularities and comprising said circular member front surface and a second such disc member comprising said rear bearing surface.

7. A fluid distribution system as claimed in claim 1 wherein one of said bearing surfaces has a recess inwardly of said annularly disposed apertures so as to concentrate the bearing pressure adjacent said apertures.

8. A fluid distribution system as claimed in claim 1 wherein said drive shaft includes an extended shaft portion integral with said shaft, said extended portion extending through both said plate and said circular member and having a threaded end segment protruding through said plate and circular member, said segment being adapted to receive a shaft nut for forcing said bearing surfaces into firm contact, said drive shaft, extended shaft portion, threaded end segment and shaft nut comprising said means for holding the bearing surface in contact.

9. A fluid distribution system as claimed in claim 1 including a chamber connected to the remote end of said outlet line, said chamber having pressure means for selectively introducing vacuum or high pressure therein, said pressure means, in association with said rotary valve, being adapted to selectively draw fluid into said chamber through one of said fluid inlet lines in a vacuum mode and being adapted to return the fluid in said chamber to its respective fluid source in a pressure mode.

10. In a machine for treating histologic tissue specimens, said machine being of the type having a frame, a treating chamber, a plurality of treating fluids which during treating are individually sequentially introduced into said chamber and individually removed therefrom after a predetermined interval, fluid containers for holding each of said fluids, and individual fluid inlet lines connected to each container, a fluid distributor comprising, in combination:

a. an electric motor mounted on said frame and having a drive shaft extending therefrom;
b. a stationary disc having substantially flat front and rear surfaces and being secured to said frame, said disc having a plurality of annularly disposed, equally spaced apertures with the number of said apertures being at least as great as the number of said inlet lines, each of said inlet lines having one end connected at the rear surface of said disc to one of said apertures;
c. a revolving disc having a bearing disc securely fastened to one flat surface thereof, both said revolving disc and said bearing disc having a circumference equal to the circumference of said stationary disc and with all three discs being aligned at their centers with said drive shaft, said bearing disc being in surface-to-surface contact with the front surface of said stationary disc, said revolving and bearing discs being secured at their centers to said drive shaft for being rotatably driven thereby, said revolving and bearing discs having a single opening positioned at a predetermined radial distance from the center of said discs so as to be adapted to register over each of said annularly disposed apertures upon rotation of said revolving and bearing discs, said revolving disc having on its peripheral edge surface a plurality of equally spaced detents adapted to being engaged by a roller member riding on said peripheral edge surface;
d. swtich means electrically connected to said motor and having a roller sensor member positioned to ride on said peripheral edge surface, said roller member being adapted to sense the presence of said detents and to open said switch means and switch off the power to said motor each time said roller member senses one of said detents, said detents and annularly spaced apertures being equal in number so as to allow said opening to register over one of said apertures each time said motor is stopped by said switch means;
e. means for holding said bearing disc and said stationary disc front surface in firm surface-to-surface contact so as to prevent leakage between said opening and said apertures; and
f. fluid transfer means connected to said opening.

* * * * *